United States Patent [19]

Heisler

[11] 4,417,735

[45] Nov. 29, 1983

[54] SEAL RING WITH TRAPEZOIDAL CONTOUR AND SPREADING ELEMENT

[75] Inventor: Kurt Heisler, Tetnang, Fed. Rep. of Germany

[73] Assignee: MTU Motoren-Und-Turbinen-Union Friedrichshafen GmbH, Fed. Rep. of Germany

[21] Appl. No.: 217,833

[22] Filed: Dec. 18, 1980

[30] Foreign Application Priority Data

Dec. 18, 1979 [DE] Fed. Rep. of Germany ....... 2950837

[51] Int. Cl.³ .................... F16J 15/06; F16L 25/00
[52] U.S. Cl. ............................ 277/101; 277/206 R; 277/236; 285/9 R; 285/31
[58] Field of Search ............... 277/101, 205, 206 R, 277/236, 12, 32; 285/31, 9 R

[56] References Cited

U.S. PATENT DOCUMENTS

| | | | |
|---|---|---|---|
| 2,204,507 | 6/1940 | Martin | 277/206 |
| 2,538,683 | 1/1951 | Guiler et al. | 277/101 X |
| 3,326,560 | 6/1967 | Trbovich | 277/205 X |
| 3,603,617 | 9/1971 | Lochridge | 285/31 X |
| 3,603,618 | 9/1971 | Stratton | 285/31 |

FOREIGN PATENT DOCUMENTS

260480 11/1926 United Kingdom ............... 277/236

*Primary Examiner*—Robert S. Ward, Jr.
*Attorney, Agent, or Firm*—Craig & Burns

[57] ABSTRACT

A sealing element located on corresponding openings of adjacent components which are rigid with respect to one another. The openings of the component terminate in sealing surfaces which are located opposite to one another and spaced from one another. A sealing ring, radially outwardly opened, is provided with a trapezoidal internal contour. The sealing ring is located between the sealing surfaces of the two components and cooperates with such components. The sealing ring is centered on a centering bead on an inside diameter of one of the components and a spreading element is located between inner leg surfaces of the trapezoidal internal contour of the ring for spreading the outer surfaces of the ring against the sealing surfaces of the component.

40 Claims, 7 Drawing Figures

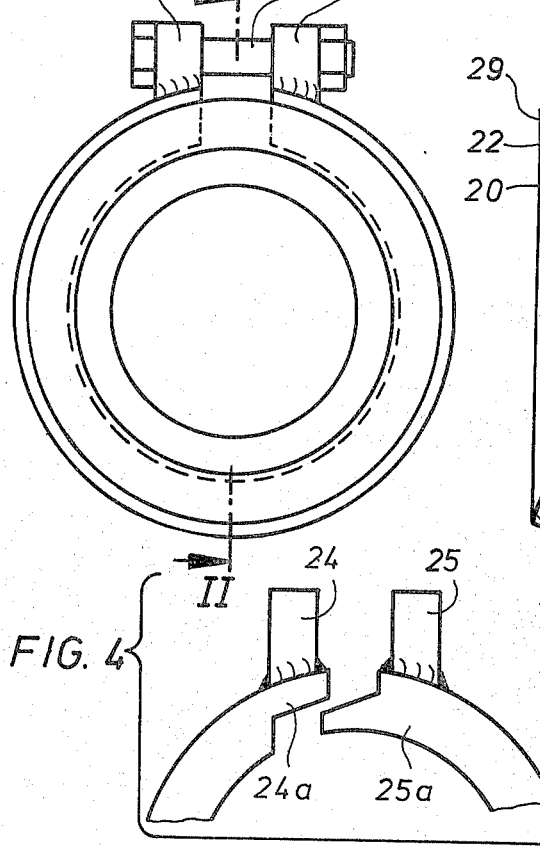
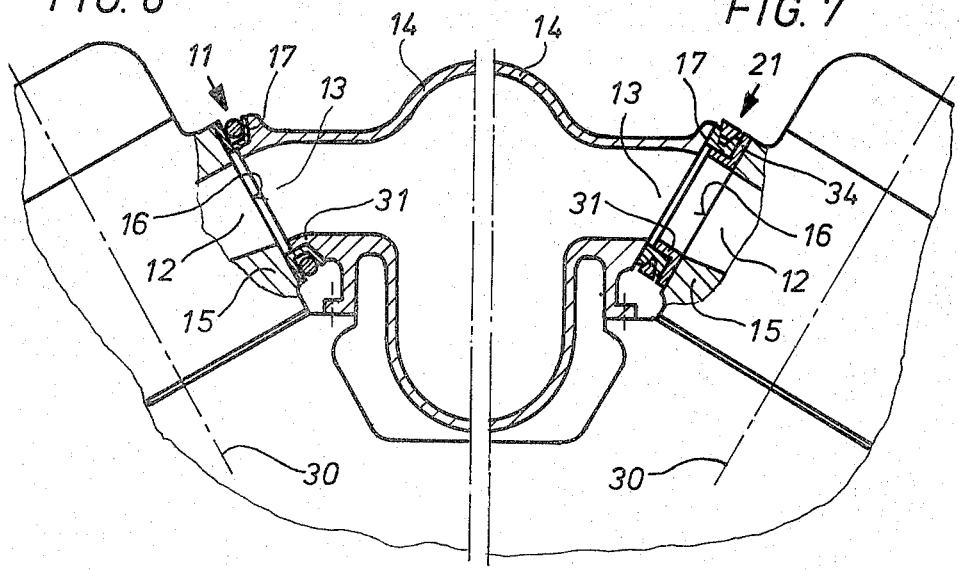

SEAL RING WITH TRAPEZOIDAL CONTOUR AND SPREADING ELEMENT

The present invention relates to a sealing element and, more particularly, to a sealing element which is adapted to be located on corresponding openings of adjacent components rigid with respect to one another, with the openings terminating in sealing surfaces which are located spaced from but opposite to one another.

A sealing element has been proposed wherein a toroidal elastic ring is pressed by a clamp into a V-shaped groove formed by bevelled areas on abutting components on either side of the joint to be sealed. Taking into account a given volume of the elastic ring and a pressure on the surface to produce a sufficient sealing action on the bevels, the width of the joint which is bridgeable by such a proposed sealing element is limited. Additionally, the heat resistance of the elastic ring, which must remain highly elastic when used on components having high temperatures such as, for example, exhaust pipes on an internal combustion engine, is generally insufficient.

The aim underlying the present invention essentially resides in providing a sealing element, which is resistant to high temperatures and which is capable of bridging a broad gap between sealing surfaces at pipe joints between adjacent components.

In accordance with advantageous features of the present invention, a ring, open at an outside diameter thereof and provided with a trapezoidal internal contour, is located between the sealing surfaces of the two components. The ring cooperates with the two components and is centered on a centering bead on an inside diameter of one of the components, with a spreading element being located between inner leg surfaces of the trapezoidal internal contour of the ring.

Advantageously, the ring may also be provided with a trapezoidal outer contour and, preferably, the ring is made in one layer of an appropriate sealing material.

It is also possible in accordance with the present invention, to provide a multiple layer ring formed of a metal ring having at least one coating of a sealing material applied to an outside contour of the metal ring.

Advantageously, the ring of the present invention may consist of two equal side discs arranged symmetrically with the discs being connected together at their inside diameters by a corrugated tube. The side discs and corrugated tube may, advantageously, be connected together by crimping or the corrugated tube may be connected to each side of the disc by, for example, a welded seam.

In accordance with further features of the present invention, the surfaces of the side discs which face one another form the trapezoidal inside contour of the ring with the faces of the side discs which are turned away from each other being in parallel.

Advantageously, the sealing material applied to the outside contour of the sealing ring may be located on outside leg surfaces of the sealing ring.

Moreover, the spreading element in accordance with the present invention may be constructed as a radially separated ring, with the ring being shortenable by means of a screw in a circumferential direction, with the screw engaging end segments of the ring.

Advantageously, the spreading element may have a cross-section which matches the trapezoidal internal contour of the ring.

The spreading element of the present invention may have a weld or oval cross-section or may be fashioned as a tube.

Additionally, end segments of the spreading element of the present invention may be wedge-shaped and overlapped.

Furthermore, the spreading element may consist of a plurality of segments, with the segments being arranged on an inside diameter of an annular tensioning band.

The sealing element of the present invention is advantageously used for transitions from cylinder heads to an exhaust manifold and/or from a charging air system of an internal combustion engine. In such an arrangement, the sealing surfaces, disposed on the cylinder head and cooperating with the ring run parallel to an axis of the cylinder.

Advantageously, a centering bead for the ring is located on the sealing surfaces which is associated with the exhaust manifold and/or the charging air intake system. The centering bead may be disposed on an intermediate flange.

The advantages achieved by the sealing element of the present invention resides in the fact that the sealing element requires no additional space over and above the volume provided by the sealing surfaces. Thus, the present invention may seal pipe junctions or space limitations rule out using pipe flanges fastened with bolts.

A further advantage of the present invention resides in the fact that the sealing element may be simply mounted and also that it is possible to readily compensate for any radial and/or angular displacement between the components. Additionally, it is also possible to reuse the sealing element by merely replacing the sealing material and the sealing element may be universally applicable by simply supplying suitable sealing materials for each case.

Accordingly, it is an object of the present invention to provide a sealing element which avoids, by a simple means, shortcomings and disadvantages encountered in the prior art.

Another object of the present invention resides in providing a sealing element which insures a sufficient sealing even when utilized to seal components at relatively high temperatures.

Yet another object of the present invention resides in providing a sealing element which is capable of bridging a broad gap between sealing surfaces of adjacent components.

A further object of the present invention resides in providing a sealing element which is simple in construction and therefore relatively inexpensive to manufacture.

A still further object of the present invention resides in providing a sealing element which readily compensates for radial and/or angular displacement between the components to be sealed.

Yet another object of the present invention resides in providing a sealing element which may readily be used to seal transition areas from cylinder heads of an internal combustion engine to the exhaust manifold and/or charging air intake system of the engine.

A further object of the present invention resides in providing a sealing element for sealing transition areas from cylinder heads to the exhaust manifold and/or charging air intake system of an internal combustion engine, which insures the existence of a sufficient seal during all operating conditions of the engine.

These and other objects, features, and advantages of the present invention will become more apparent from the following description when taken in connection with the accompanying drawings, which show, for the purpose of illustration only, several embodiments in accordance with the present invention, and wherein:

FIG. 1 is a side view of a sealing element constructed in accordance with the present invention;

FIG. 2 is a cross-sectional view of the sealing element of the present invention taken along the line II—II in FIG. 1;

FIG. 3 is a partial cross-sectional view through a sealing element taken along the line II—II in FIG. 1 with an alternative construction for a clamping element;

FIG. 4 is a partial side view of an alternative embodiment of a joint of a clamping element in accordance with the present invention;

FIG. 5 is a partial cross-sectional view of an alternative embodiment of a sealing element in accordance with the present invention;

FIG. 6 is a partial front view of a V-shaped internal combustion engine with an exhaust manifold disposed between rows of cylinders of the engine, with the manifold being connected to a cylinder head of the engine by a sealing element such as illustrated in FIG. 1; and FIG. 7 is a partial front view of a V-shaped internal combustion engine with an exhaust manifold disposed between rows of cylinders of the engine, with the manifold being connected to a cylinder head of the engine by a sealing element such as illustrated in FIG. 5.

Referring now to the drawings when like reference numerals are used throughout the various views to designate like parts and, more particularly, to FIGS. 1 and 2, according to these figures, a sealing element includes a thin walled ring generally designated by the reference numeral 18 having an open outside diameter and being provided with a trapezoidal interior and exterior contour. The sealing ring 18 is provided with outer surfaces 19, 20 adapted to cooperate with sealing surfaces of components to be sealingly joined in a manner more fully described hereinbelow.

A spreading element formed, for example, as a split ring 23 is disposed between inner leg surfaces 22, 26 of the ring 18. The spreading element or split ring 23 is provided with end segments 24, 25, with a threaded fastener such, for example, a screw 27 being adapted to connect the end segments 24, 25 together. By adjusting the screw 27 in a tightening direction, the circumference of the ring 23 is shortened. The tightening of the ring 23 by the screw 27 results in a spreading of the legs of the rings 18 so that the outer leg surfaces 19, 20 may be applied in a sealing fashion to sealing surfaces of the components to be joined.

The ring 18 may be composed of a single layer of suitable sealing material or formed with a plurality of layers of sealing material. With a multi-layered sealing ring, such sealing ring would consist of a supporting metal ring and at least one coating of a sealing material. Advantageously, as shown most clearly in FIGS. 2 and 3, the sealing material may be applied in the form of discs 28, 29 only to an outer leg surface 19, 20 of the ring 18 so that only the sealing material need to be replaced when the sealing element is disassembled.

As shown in FIG. 2, the split ring 23 may have a round cross-sectional configuration or, for example, a spreading element 23' may be provided having an oval cross-sectional configuration such as shown in FIG. 3. The split ring 23 and spreading element 23' may either be solid or hollow. Moreover, as shown in FIG. 5, a spreading element 23' may be provided which is fashioned to match a trapezoidal interior shape of a sealing ring generally designated by the reference numeral 18'.

In order to apply a sealing force over an entire circumference of the two leg surfaces 22, 26 of the sealing ring, it is also possible, as shown in FIG. 4, for portions 24a, 25a of the spreading element, in an area of the end segments 24, 25, to overlap one another in a wedged fashion.

In order to facilitate an assembly of the spreading element and the sealing ring 18, it is possible to make the ring 23, 23', or 23'' forming the spreading element from several segments which may be arranged on an inside diameter of an annular tensioning band (not shown). In this manner, the spreading element may be bent, without expending great forces, in such a manner that the spreading element may be easily fitted into the trapezoidal interior contour of the sealing ring 18 or 18'.

As shown in FIG. 5, the ring 18' of the sealing element includes two similar symmetrically arranged side discs 32a, 32b which are closely connected together at their inner diameter by a corrugated tube 23. The corrugated tube 23 may be fastened to their respective side discs 32a, 32b by, for example, crimping or welding. The trapezoidal inner contour of the ring 18', required for accommodating the spreading element 23'', is formed by bevelled facing surfaces 22', 26' of the side discs 32a, 32b. The surfaces of the side discs 32a, 32b which face away from one another may form the above-noted trapezoidal outer contour of the ring 18'.

As can readily be appreciated, the sealing element of the present invention may be mounted on corresponding openings of elements which are rigid with respect to each other, with the openings terminating in sealing surfaces which are spaced from one another. More particularly, FIGS. 6 and 7 provide an example of the use of the sealing elements of the present invention applied to a V-shaped internal combustion engine, wherein the sealing elements are employed for sealing transistion points between cylinder heads and an exhaust manifold and/or charging air intake system of the internal combustion engine.

As shown in FIG. 6, an exhaust manifold and/or charging air intake system 14 is arranged between the banks or rows of cylinders of a V-shaped internal combustion engine. A first rigid component formed as a cylinder head 15 is provided with a sealing surface 16. The sealing surface 16 extends in parallel to a center longitudinal axis of the respective cylinders. By virtue of the disposition of the sealing surface 16 in the above-noted manner, it is possible to disassemble the respective cylinder heads 15 without having to remove the exhaust manifold and/or the charging air system 14.

As also shown in FIG. 6, a sealing element generally designated by the reference numeral 11, corresponding in principle to the sealing element of FIGS. 1 and 2, is interposed between the sealing surface 16 and a sealing surface 17 of the exhaust manifold and/or charging air intake system 14, with the sealing surfaces 16, 17 being spaced from one another. The exhaust manifold and/or charging air intake system 14 is mounted at the respective cylinder heads 15 so that the openings 12, 13 which terminate in the sealing surfaces 16, 17 are in alignment.

With a sealing element 11 constructed in principle in accordance with the embodiment of FIGS. 1 and 2, in order to permit the above-noted simple disassembly of the cylinder heads 15 without removing the exhaust manifold and/or charging air system 14, a centering bead 13 is necessary for centering the ring 18 to be mounted on the sealing surface 17.

As shown in FIG. 7, the exhaust manifold and/or charging air system 14 may be mounted at the respective cylinder heads 15 with a sealing element generally designated by the reference numeral 21 which corresponds in principle to the sealing element of FIG. 5. With the sealing element 21 formed with parallel outside surfaces on side discs 32a, 32b and with the arrangement and disposition shown in FIG. 7, the position of the centering bead 31 may be somewhat arbitrarily selected. The advantages of making the sealing surfaces 16, 17 in a manner proposed herein will become more apparent when the centering bead 31 is located on an intermediate flange 34.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A sealing element adapted to be located between two adjacent components which are rigid with respect to one another, each of the components including an opening terminating in a sealing surface, the sealing surfaces being disposed in opposition to and spaced from one another, characterized in that a sealing ring is disposed between the two sealing surfaces, the ring includes a trapezoidal inner contour which opens toward an outside, and in that means are interposed between inner surfaces of the sealing ring for spreading outside surfaces of the sealing ring against the respective sealing surfaces.

2. A sealing element according to claim 1, characterized in that means are provided on an inner diameter of one of the adjacent components for centering the sealing ring.

3. A sealing element according to claim 2, characterized in that the centering means is a centering bead.

4. A sealing element according to claim 2, characterized in that the sealing ring has a trapezoidal-shaped outer contour.

5. A sealing element according to claim 4, characterized in that the sealing ring is formed of a single layer of a sealing material.

6. A sealing element according to claim 4, characterized in that the sealing ring is formed of a plurality of layers of sealing material.

7. A sealing element according to claim 4, characterized in that the sealing ring includes a metal ring, and in that at least one layer of a sealing material is provided on respective outer surfaces of the metal ring.

8. A sealing element according to claim 2, characterized in that the sealing ring includes a pair of symmetrically arranged discs having a central aperture therein, and in that means are provided for connecting inner diameters of the discs to each other.

9. A sealing element according to claim 8, characterized in that the connecting means is formed as a corrugated tube.

10. A sealing element according to claim 9, characterized in that the corrugated tube is attached to the respective discs by a welded seam.

11. A sealing element according to claim 9, characterized in that the corrugated tube is crimped to the respective discs.

12. A sealing element according to claim 11, characterized in that inner surfaces of the respective discs facing each other form the trapezoidal inner contour of the sealing ring.

13. A sealing element according to claim 12, characterized in that outer faces of the respective discs facing away from each other are disposed in parallel.

14. A sealing element according to claim 13, characterized in that at least one layer of a sliding material is provided on the outer faces of the respective discs.

15. A sealing element according to claim 14, characterized in that the spreading means is a radially separated ring member terminating in end segments, and in that means are provided for cooperating with the end segments for circumferentially shortening the ring member.

16. A sealing element according to claim 15, characterized in that the means for circumferentially shortening the ring member is an adjustment screw engageable with the respective end segments.

17. A sealing element according to claim 15, characterized in that the ring member has a trapezoidal cross-sectional configuration corresponding to the trapezoidal inner contour of the sealing ring.

18. A sealing element according to claim 17, characterized in that the ring member has a solid cross-section.

19. A sealing element according to claim 17, characterized in that the ring member has a hollow cross-section.

20. A sealing element according to claim 15, characterized in that the ring member has a round cross-sectional configuration.

21. A sealing element according to claim 20, characterized in that the ring member has a solid cross-section.

22. A sealing element according to claim 20, characterized in that the ring member has a hollow cross-section.

23. A sealing element according to claim 15, characterized in that the ring member has an oval configuration.

24. A sealing element according to claim 23, characterized in that the ring member has a solid cross-section.

25. A sealing element according to claim 24, characterized in that the ring member has a hollow cross-section.

26. A sealing element according to claim 13, characterized in that the spreading means is formed as a tube member.

27. A sealing element according to claim 13, characterized in that the spreading means includes a plurality of individual segments, and in that the individual segments are disposed in an inside diameter of an annular tensioning band.

28. A sealing element according to claim 15, characterized in that portions of the end segments are formed so as to be wedge-shaped, and in that the portions are adapted to overlap each other when the ring member is circumferentially shortened.

29. A sealing element according to claim 1, arranged on an internal combustion engine, characterized in that one of the components is a cylinder head of the internal combustion engine and the other component is one of an exhaust manifold and a charging air system of the internal combustion engine, and in that the sealing surface of the cylinder head cooperating with the sealing ring extends in parallel to a longitudinal center axis of a cylinder of the internal combustion engine.

30. A sealing element according to claim 29, characterized in that means are provided on the sealing surface of the other component for centering the sealing ring.

31. A sealing element according to claim 30, characterized in that the centering means is a centering bead.

32. A sealing element according to claim 31, characterized in that the centering bead is disposed on an intermediate flange of the sealing ring.

33. A sealing element according to one of claims 1, 29, 30, or 32, characterized in that the sealing ring has a trapezoidal-shaped outer contour.

34. A sealing element according to one of claims 1, 29, 30, or 32, characterized in that the sealing ring includes a metal ring, and in that at least one layer of a sealing material is provided on respective outer surfaces of the metal ring.

35. A sealing element according to one of claims 1, 29, 30, or 32, characterized in that the sealing ring includes a pair of symmetrically arranged discs having a central aperture therein, and in that means are provided for connecting inner diameters of the discs to each other.

36. A sealing element according to claim 35, characterized in that the connecting means is formed as a corrugated tube.

37. A sealing element according to one of claims 1, 29, 30, or 32, characterized in that the spreading means is a radially separated ring member terminating in end segments and in that means are provided for cooperating with the end segments for circumferentially shortening the ring member.

38. A sealing element according to claim 37, characterized in that the ring member has a trapezoidal cross-sectional configuration corresponding to the trapezoidal inner contour of the sealing ring.

39. A sealing element according to one of claims 1, 29, 30, or 32, characterized in that the spreading means includes a plurality of individual segments, and in that the individual segments are disposed in an inside diameter of an annular tensioning band.

40. A sealing element according to one of claims 1, 29, 30, or 32, characterized in that at least one disc member formed of a sealing material is disposed on the respective outside surfaces of the sealing ring which are urged against the respective sealing surfaces.

* * * * *